E. DENIÉPORT.
ELECTRIC CONDENSER.
APPLICATION FILED MAY 23, 1908.
934,714. Patented Sept. 21, 1909.
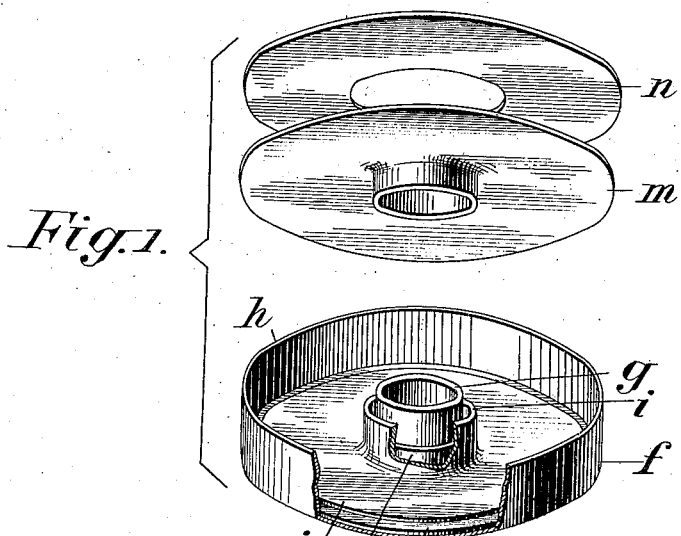
Fig.1.
Fig.2.
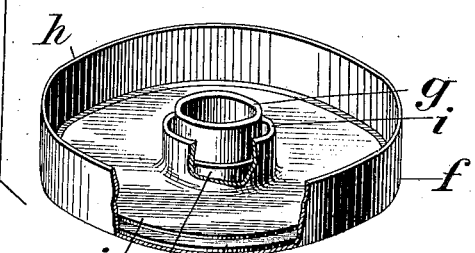
Fig.3.
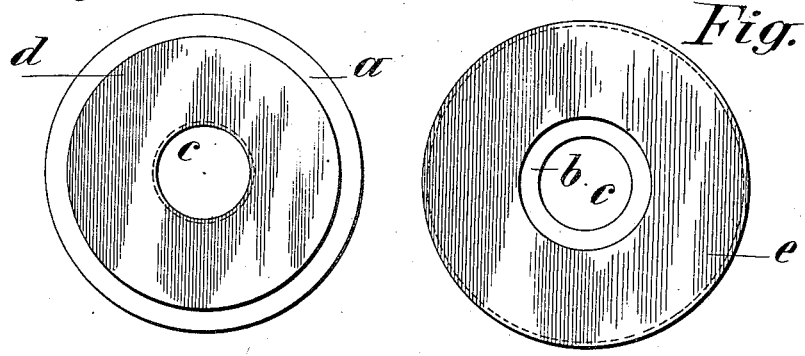
Fig.4.
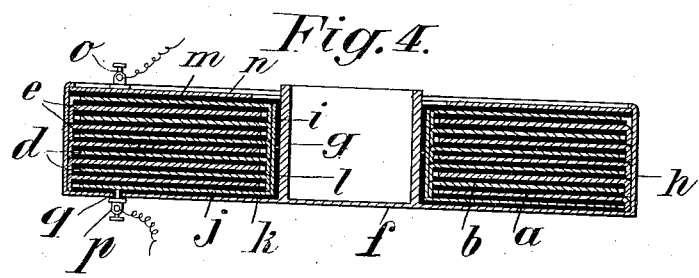
Witnesses:
H. T. Brown
Walter V. Harris
Inventor:
Edouard Deniéport.
By H. A. deV.
Attorney.

UNITED STATES PATENT OFFICE.

EDOUARD DENIÉPORT, OF SURESNES, FRANCE.

ELECTRIC CONDENSER.

934,714.　　　　　　　Specification of Letters Patent.　　Patented Sept. 21, 1909.

Application filed May 23, 1908. Serial No. 434,569.

*To all whom it may concern:*

Be it known that I, EDOUARD DENIÉPORT, a citizen of the Republic of France, and resident of Suresnes, Seine, France, have invented certain new and useful Improvements in Electrical Condensers, of which the following is a specification.

The present invention relates to improvements in electrical condensers, and has particular reference to the form and arrangement of the condenser plates whereby it is easy to construct the apparatus of a small bulk while at the same time, the said plates are protected from the effects of any external influences or improper handling, such plates being fitted within a box forming one of the current connections.

In the accompanying drawing wherein I have illustrated the preferred form of my invention, Figure 1 is a perspective view of the box (in part dismounted) which serves as an envelop or casing for the conducting plates and which also forms one of the supply connections for the current of the electric circuit into which the condenser is to be inserted. Fig. 2 is a plan view of one of the parts forming one element or series of condenser plates. Fig. 3 is the corresponding view of one of the parts forming the other element or series of condenser plates. Fig. 4 is a vertical section of the condenser as a whole, on a somewhat larger scale.

The two condenser elements are formed of equal sized rings $a$, $b$, of paraffined paper, mica, or other like material. These rings have a hole $c$ in the center and are provided on one side with tin or other metal lining in accordance with the usual practice in making condensers.

The parts $a$ (Fig. 2) forming the dielectric of one element or series of plates have a conducting plate lining $d$ of tin, which projects inward slightly beyond the periphery of the hole $c$, in the center and extends outward only a distance which is short of the outer edge of the ring, as shown. The edge which is thus left uncovered forms an insulator between the outer portions of adjacent plates. On the other hand, the parts $b$ (Fig. 3) constituting the other dielectric of the element or series of plates are also provided with a metal lining $e$, which projects slightly beyond the outer edge of the ring and which does not extend inward quite as far as the periphery of the hole $c$ in the center. Around the hole $c$ there is thus left uncovered an annular strip which forms an insulator between the inner portions of adjacent plates.

The rings $a$ and $b$ are superimposed one upon another, one ring of each element or series of conducting plates being placed alternately on top of a ring of the other element or series (Fig. 4). It will thus be seen that all the metal linings, or plates $d$, forming one of the elements are continued inward beyond the hole $c$, in the center of the paraffined paper, mica, or the like, that they may be put into connection by bending or turning down the metal portions which extend beyond the peripheral edge of the hole $c$ and that by introducing a metal socket into the hole, or otherwise, the said inwardly extending metal portions may be so bent as to form a lining for the sides of $c$. Similarly all the metal plates or linings $e$ forming the other series of plates which extend beyond the periphery of the insulating rings can be put into electrical communication by turning down the projecting portions of metal and binding them together on the outside by a band of metal; or by covering the outside edges with metallic sheets. The elements or series of plates thus formed are fitted into a metal box $f$ which protects them. This box, which has a raised core ring $g$ in the center, serves as a guide for the arrangement of the condenser as a whole and is united at and by its edge $h$ with the outer connected portions of the plates $e$, and the said edge $h$ acts as an external connecting band as above described.

The other series of plates $d$ is connected with a socket $i$ (Fig. 1) forming part of a metallic disk $j$ which surrounds the central core ring $g$ in the bottom of the box $f$. The disk $j$ rests on the bottom of the box $f$ and is insulated from it by the interposition of a disk $k$, of ebonite or other suitable material. Between the socket $i$ and the center core ring $g$ is interposed a sleeve $l$ of suitable insulating material.

An insulating disk $m$ (Fig. 1) identical with the piece $k$, is interposed between the upper condenser plates and the metal cover $n$, which latter closes the incasing box $f$, the top edge of said box being turned over as shown in Fig. 4, to hold the cover n securely in position.

The elements or series of plates of the condenser may be connected with external wires for example, by means of the binding screws o, p, one of which is fitted on the cover n and is in communication with the series of plates e while the other binding screw is mounted on the disk j and is in communication with the series of plates d. The binding screw p passes through the bottom of the box and is provided with a bushing q of insulating material.

From the above it will be seen that a condenser constructed in accordance with my invention is protected against any injurious external action, is of reduced bulk, and can be operated in rotation, (for example, in high tension magnetos) by mounting the socket g on the end of any spindle or shaft.

Having now fully described my said invention, what I claim and desire to secure by Letters Patent is:—

1. In a condenser of the character described the combination of a plurality of superposed washers of dielectric material lined at their surface with a lining of conducting material projecting alternately at the outer edge and at the inner edge of the washers and extending respectively inward and outward only to a certain distance short of the inner and outer edge respectively, the projecting edges of the said conducting linings being electrically connected both at the outer and the inner periphery thereof, and means for conducting current to both sets of washers, substantially as and for the purpose set forth.

2. In a condenser of the character described the combination of two sets of alternately superposed washers of dielectric material lined on one of their surfaces with a layer of conducting material, the lining of the one of the sets projecting beyond the outer edge of the washer and only extending short of the inner edge thereof and the lining of the other set projecting beyond the inner edge of the washers and only extending short of the outer end thereof, a metallic plate applied to the bottom of the said pile of two sets of washers and provided with a central sleeve adapted to frictionally engage the opening of the said washers and to fold upon each other those parts of the lining which project from one set of washers into the said inner opening and a box adapted to frictionally engage the outer surface of the said washers and to fold upon each other the projecting parts of the conducting lining of the other set of washers, means for insulating the said metallic plate and its central sleeve from the said box and means for conducting current to the said box and to the said metallic plate, substantially as and for the purpose set forth.

3. In a condenser of the character described the combination of two sets alternately superposed washers of dielectric material, lined on one of their surfaces with a layer of conducting material, the lining of the washers of one set projecting beyond the outer edge of the washer and extending only short of the inner edge thereof and the lining of the other set of washers projecting beyond the inner edge of the washers and extending only short of the outer end thereof, a metallic base plate applied to the bottom of the two sets of washers and provided with a central sleeve adapted to project through and frictionally engage the central opening of said washers and to fold upon each other the projecting parts of the conducting lining of one of the sets of washers, an insulating base plate applied against the bottom of the said metallic plate and provided with a central insulating sleeve adapted to engage the metallic sleeve of said metallic plate and having only half the height of the latter, an insulating top plate arranged upon the top of the said pile of washers and provided with a central sleeve adapted to engage the central sleeve of said metallic base sleeve and to project therein on half its height, a metallic box having an outer wall adapted to frictionally engage the outer surface of said washers and to fold upon each other the projecting parts of the other set of washers, a bottom adapted to engage the said insulating base plate and a central sleeve adapted to frictionally engage the central sleeves of said top and bottom insulating plates, a metallic cover arranged on the said top insulating plate and held in position by the bent upper edge of the said box, a binding post secured to said cover and a second binding post secured to said metallic base plate and means for insulating the said second binding post from the bottom of said box, substantially as and for the purpose set forth.

4. A condenser of the character described, comprising a series of superimposed annular metal sheets, each alternate sheet being electrically connected at its outer edge, the remaining sheets being electrically connected at their inner edge and each sheet being insulated from contiguous sheets whereby the connected sheets are insulated from each other and means for conducting current to each series of connected sheets, substantially as described.

5. A condenser of the character described, comprising a series of superimposed annular metal sheets, a metal sleeve extending within said sheets, a metal casing surrounding said sheets, each alternate sheet being electrically connected with said sleeve, the remaining sheets being electrically connected with said casing, and each sheet being insulated from contiguous sheets whereby the connected sheets are insulated from each other, and means for conducting current to each series of sheets.

6. A condenser of the character described, comprising a series of superimposed annular metal sheets, sheets of insulation interposed between said sheets, each alternate metal sheet extending outward beyond the outer edges of the contiguous insulating sheets, the remaining metal sheets extending inward beyond the inner edges of contiguous insulating sheets, the said projecting edges being electrically connected and the said inner edges being electrically connected, and means to conduct current to each series of connected sheets, substantially as described.

7. A condenser of the character described, comprising a series of superimposed annular metal sheets, sheets of insulation interposed between said sheets, each alternate metal sheet extending outward beyond the outer edges of the contiguous insulating sheets, the remaining metal sheets extending inward beyond the inner edges of contiguous insulating sheets, the said projecting edges being bent or downturned against each other, and means to conduct current to each series of connected sheets, substantially as described.

8. A condenser of the character described, comprising a series of superimposed annular metal sheets, sheets of insulation interposed between said sheets, each alternate metal sheet extending outward beyond the outer edges of the contiguous insulating sheets, the remaining metal sheets extending inward beyond the inner edges of contiguous insulating sheets, the said projecting edges being bent or downturned against each other, a metal sleeve in contact with the inner bent or downturned edges and a surrounding metal casing in contact with the outer bent or downturned edges, means for insulating said sleeve from said casing and means for conducting current to each series of connected sheets, substantially as described.

In testimony whereof I have hereunto set my hand in presence of two witnesses.

EDOUARD DENIÉPORT.

Witnesses:
 AD. STURM,
 H. C. COXE.